United States Patent
Campanelli et al.

(10) Patent No.: US 8,634,713 B2
(45) Date of Patent: Jan. 21, 2014

(54) FIBRE MONITORING IN OPTICAL NETWORKS

(75) Inventors: Carlo Campanelli, Grumo Appula (IT); Roberto Magri, Parma (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 13/060,834

(22) PCT Filed: Aug. 29, 2008

(86) PCT No.: PCT/EP2008/061399
§ 371 (c)(1),
(2), (4) Date: May 17, 2011

(87) PCT Pub. No.: WO2010/022787
PCT Pub. Date: Mar. 4, 2010

(65) Prior Publication Data
US 2011/0217036 A1    Sep. 8, 2011

(51) Int. Cl.
 *H04B 10/08* (2011.01)
 *H04B 17/00* (2006.01)
 *G01N 21/00* (2006.01)

(52) U.S. Cl.
 USPC ...... 398/10; 398/9; 398/17; 398/21; 356/73.1

(58) Field of Classification Search
 USPC ......... 398/9–10, 13, 16–17, 20–21; 356/73.1; 359/333
 See application file for complete search history.

(56) References Cited

U.S. PATENT DOCUMENTS

| | | | |
|---|---|---|---|
| 5,844,235 A | 12/1998 | Tachikawa et al. | |
| 5,991,479 A * | 11/1999 | Kleinerman | 385/31 |
| 6,008,487 A | 12/1999 | Tachikawa et al. | |
| 6,721,089 B1 * | 4/2004 | Miller et al. | 359/341.3 |
| 8,396,360 B2 * | 3/2013 | Healey et al. | 398/16 |
| 2002/0118442 A1 | 8/2002 | Ghera et al. | |
| 2004/0196158 A1 * | 10/2004 | Sugaya et al. | 340/815.4 |
| 2004/0208523 A1 * | 10/2004 | Carrick et al. | 398/32 |
| 2008/0285037 A1 * | 11/2008 | Sanders | 356/437 |

FOREIGN PATENT DOCUMENTS

| | | |
|---|---|---|
| JP | 53-055146 | 5/1978 |
| JP | 06-006309 | 1/1994 |
| JP | 08-210944 | 8/1996 |
| JP | 09-079942 | 3/1997 |

(Continued)

OTHER PUBLICATIONS

International Search Report for PCT/EP2008/061399, mailed Apr. 24, 2009.

(Continued)

*Primary Examiner* — Kenneth Vanderpuye
*Assistant Examiner* — Casey Kretzer
(74) *Attorney, Agent, or Firm* — Nixon & Vanderhye P.C.

(57) ABSTRACT

A method of monitoring (200) an optical fiber comprises modulating (210) an optical signal with a traffic signal; modulating (220) the optical signal with an incoherent optical frequency domain reflectometry, IOFDR, test signal; transmitting (230) the doubly modulated optical signal onto an optical fiber at a first end of the fiber; detecting (240) scattered radiation output from the first end of the fiber; and analyzing (250) the detected scattered radiation using incoherent optical frequency domain reflectometry to determine a distance to a break in the optical fiber. Apparatus suitable for carrying out the method is also described, as well as an optical communications network employing the method.

13 Claims, 10 Drawing Sheets

(56) References Cited

FOREIGN PATENT DOCUMENTS

| | | |
|---|---|---|
| WO | WO 97/23965 | 7/1997 |
| WO | WO 97/32191 | 9/1997 |
| WO | WO 98/15816 | 4/1998 |
| WO | WO 02/47293 | 6/2002 |

OTHER PUBLICATIONS

Harres, Daniel N., "Optical Phase Domain Reflectomerter", Avionics, (Oct. 1, 2007), pp. 50-51.

Pierce, S.G. et al., "Optical frequency-domain reflectometry for microbend sensor demodulation", Applied Optics, vol. 29, No. 25, (Sep. 1, 2000), pp. 4569-4581.

Selvan, B. et al., "Network monitoring for passively split optical fibre networks", Accession No. 19970128, (Jan. 28, 1997), pp. 5/1-5/4.

Chryssis, A.N. et al., "Incoherent Optical Frequency Domain Interferometry for Avionics", Avionics Fiber-Optics and Photonics, (Sep. 12-14, 2006), pp. 34-35.

Japanese Official Action and English Summary mailed Oct. 1, 2012 in Japanese Application No. 2011-524198.

K. Yiiksel et al., Optical-Frequency Domain Reflectometry: Roadmap for High-Resolution Distributed Measurements, IEEE Laser and Electro-Optics Society Symposium—Benelux Chapter, pp. 231-234, Bruxelles (B), Dec. 17-18, 2007.

* cited by examiner

FIBRE MONITORING IN OPTICAL NETWORKS

This application is the U.S. national phase of International Application No. PCT/EP2008/061399, filed 29 Aug. 2008, which designated the U.S., the entire contents of which is hereby incorporated by reference.

TECHNICAL FIELD

This application relates to fibre monitoring in optical networks, and particularly, but not exclusively, to apparatus and methods for the detection and location of fibre breaks within an optical network.

BACKGROUND

An optical network is usually composed of a plurality of nodes connected together by lengths of optical fibre known as 'spans'. A typical optical network is depicted schematically in FIG. 1. The network 50 comprises a plurality of nodes 20 connected by fibre spans 30. Only three nodes 20 are shown for clarity. However, it will be appreciated that a network will usually contain many more nodes. Each span may comprise two (or more) fibres, for example an outbound fibre to carry communications traffic (in the form of a modulated optical signal) away from a node, and a return fibre to carry traffic towards the node. Although the spans shown connect two adjacent nodes, it will be appreciated that "span" may equally refer to a connection between two non-adjacent nodes, where there are intervening nodes.

The network 50 may contain many different types of nodes, each having one or more functions. For example, nodes 20a and 20c are add/drop nodes, at which optical traffic signals are added or dropped from the network 50. Such nodes comprise laser optical radiation sources onto the output of which an electrical signal is modulated to create a traffic signal, as well as demodulation equipment able to recover information in the form of an electrical signal from received optical radiation. Node 20b is a repeater node, which does not add or drop signals from the network 50, but instead forwards received optical signals on, usually with additional amplification to boost the signal power. Other nodes may perform both those node functions, and may be able to introduce/remove signals from the traffic as well as amplify and retransmit received traffic signals.

The transmission of signals throughout the network is controlled from a central office 40. The central office 40 oversees signal routing and fault detection within the network.

When an optical fibre within the network breaks, it is usually possible to detect the span in which the break has occurred from the fact that a receiver node/amplifier does not receive any optical power from a remote transmitter node (sometimes also termed a launch amplifier). When the term 'break' is used, it is meant that the fibre is damaged such that optical signals are not transmitted all the way along the fibre to a receiver remote from the source of optical signals.

Each span within a network can be many kilometres long (usually up to 100 km). Thus, when a fibre break occurs, it is desirable to detect the position of the fibre break along the span with a suitable precision, in order to give the personnel that must repair the fault as precise information as possible about the position of the break, to avoid the need to search the entire span for the break. However, although as discussed above it is quite simple to determine which fibre span is damaged, it is not easy to detect exactly where the fibre is broken.

The most common prior art methods for locating fibre breaks launch optical power into an end of the affected span and then process the backscattered signal. Some methods use an OTDR (Optical Time Domain Reflectometer) integrated in different ways into the communications system, or used as a stand-alone instrument operated by personnel. Optical time division reflectometry requires sending high power short duration pulses of radiation into a fibre under test, and detecting the signal that is backscattered from a break or defect in the fibre. The distance to the break can be determined by processing the signal in a known way.

Such OTDR methods can be divided into methods suitable for in-service systems, and methods which are only suitable for out-of-service systems. For example, consider a system which comprises an add/drop node shortly after a launch amplifier, where there is a break after the add/drop node. Traffic dropped at the add drop node will not be affected by the break, but may be affected by any diagnostic test run from the launch amplifier which tries to locate the break. In the case of an in-service test, the dropped traffic would be (substantially) unaffected by the test. In the case of an out-of-service test, however, the dropped traffic might be severely disrupted, and the add/drop node and other equipment further downstream might be damaged, if traffic is not halted whilst the test is performed.

In the case of out-of-service systems, an OTDR signal is transmitted into the affected fibre link at the wavelengths of the traffic. This signal is backscattered from a break of the fibre, and then detected and processed in a suitable way. Such systems can only be used when the entire link, in both directions, is considered out of service, because the use of an in-band signal (i.e. a signal at the same, or similar, wavelength to the traffic) may interfere with and disrupt traffic present on the span in question, and on downstream spans. Care must be taken to avoid burning out the receiver optics with the OTDR signal, because the in band OTDR signal is amplified by optical repeaters in the same way as traffic channels, and so risks being demultiplexed and sent to the expensive and delicate receiver optics.

In-service systems overcome these problems by using a test signal at a different wavelength to the traffic, for example an out-of-band tone, or the optical supervisory channel, for the OTDR (so that such a signal will not be amplified or demultiplexed). However, such systems are more expensive, as they require additional equipment to conduct the fibre testing, in the form of an additional launch amplifier, and occasionally even an additional 'spare' fibre.

The requirement for expensive additional equipment to be installed at each node can be overcome by the use of a stand-alone OTDR instrument. However, this has the drawback that it requires the use of human personnel, which must first detect the location of the break from one end of the fibre, the move to the site of the fibre break in order to repair the break, resulting in a higher labour cost, and the possibility of further failures due to the fact the personnel must handle the equipment inside the station/node of the link).

It is an object of the present invention to alleviate some or all of the above problems.

SUMMARY

According to a first aspect of the invention there is provided a method of monitoring an optical fibre, the method comprising: modulating an optical signal with a traffic signal; modulating the optical signal with an incoherent optical frequency domain reflectometry, IOFDR, test signal; transmitting the doubly modulated optical signal onto an optical fibre at a first end of the fibre; detecting scattered radiation output from the first end of the fibre; and analysing the detected scattered radiation using incoherent optical frequency domain reflectometry to determine a distance to a break in the optical fibre.

Using such a method the location of a fibre break may be determined whilst the fibre is in use, without disrupting traffic on the fibre or on downstream fibres, and without risking damage to downstream receiver optics.

Usually, the optical signal will have a defined wavelength or wavelength range. That wavelength range may be centred around 1550 nm.

The IOFDR signal is preferably modulated onto the optical signal at an amplifier, by modulating an output of a laser used to pump a gain medium of the amplifier. In that way the IOFDR signal may be modulated onto the optical signal using the same amplifier that is used to amplify and/or initiate a traffic signal, and at the same wavelength as a traffic signal. Thus only one amplifier/laser is needed to produce both the traffic signal and the IOFDR signal.

The traffic signal may be modulated onto the optical signal before the IOFDR test signal (for example, in a case where the IOFDR is introduced into the optical signal at a repeater amplifier, which is operable to amplify an incoming optical signal and retransmit the amplified optical signal). It will be appreciated that alternatively the traffic signal might be modulated onto the optical signal after the IOFDR test signal (for example, in a case where the optical signal, including the IOFDR test signal, is produced by a launch amplifier/laser, which signal is subsequently modulated with a traffic signal).

The IOFDR signal may be a sinusoidal signal having a known frequency and amplitude. The steps of modulating the laser output, transmitting the doubly modulated optical signal, and detecting scattered radiation may be repeated a plurality of times, the frequency of the IOFDR test signal being altered at least one of those times, and preferably at each of the plurality of times, the frequency increasing in steps from a first time to a last time.

Analysing the detected scattered radiation may comprise comparing the detected scattered radiation with the doubly modulated optical signal. The comparison include combining the detected scattered signal with a phase-shifted copy of the doubly modulated optical signal to produce a combined signal, and filtering that combined signal with a low pass filter. The above processing may be carried out in order to determine a frequency (f_max) which corresponds to a maximum of the combined signal.

Analysing the detected scattered radiation may further include determining a fibre length, or a set of fibre lengths, associated with reflections from the frequency (f_max). In the case that a set of fibre lengths corresponds to the frequency (f_max), the step of analysing may further include distinguishing a real distance to the fibre break from the set of lengths.

The fibre length or set of fibre lengths are preferably determined by solving the equation $$f(L) = e^{-2La} \cdot \sqrt{(2k_{max}L)^2 + (2La+1)^2} \cdot$$
$$\sin\left(2k_{max}L + 2\cdot\arctan\left(\frac{k_{max}}{a}\right) + \arctan\left(\frac{2La+1}{2k_{max}L}\right)\right) -$$
$$\cos\left(2\cdot\arctan\left(\frac{k_{max}}{a}\right)\right) = 0.$$

In the case that a set of fibre lengths corresponds to the frequency (f_max), to distinguish the real distance to the fibre break from the set of lengths, solutions to the equation f(L) that do not relate to an absolute maximum of the equation $$G(f, L, a) = \frac{\sqrt{(e^{2La}\cdot\cos(2kL)-1)^2 + (e^{2La}\cdot\sin(2kL))^2}}{\sqrt{a^2+k^2}} *$$
$$\sin\left(-a\tan\left(\frac{k}{a}\right) + a\tan\left(\frac{e^{2La}\cdot\sin(2kL)}{e^{2La}\cdot\cos(2kL)-1}\right)\right)$$

may be discarded.

A method of monitoring an optical fibre may further comprise: modulating a second optical signal with a second incoherent optical frequency domain reflectometry, IOFDR, test signal; transmitting the modulated second optical signal onto the optical fibre, or an associated optical fibre, at a second end of that optical fibre; detecting second scattered radiation output from the second end of the optical fibre; and analysing the second scattered radiation, as well as the first scattered radiation, using incoherent optical frequency domain reflectometry, to determine the distance to the break in the optical fibre.

By 'an associated fibre' it is meant a fibre that follows the same physical route as the first optical fibre, for example, a fibre that is located in the same conduit or duct as the first fibre. One example of associated fibres is a pair of fibres extending between two network nodes, the pair comprising an outbound fibre for conveying traffic between the nodes in a first direction, and a return fibre for conveying traffic between the nodes in a second direction opposite to the first direction.

Such a modified method effectively requires performing the method of the first aspect of the invention twice, from opposite ends of a fibre. Using that modified method it may be possible to determine the location of a fibre break more accurately, especially in the case of longer fibres. In particular, the analysing may comprise comparing a set of possible distances to the break which have been determined from the first scattered radiation with a set of possible distances to the break which have been determined from the second scattered radiation in order to determine a real distance to the break.

The detected scattered signal may be filtered to reduce a noise content of the signal.

According to a second aspect of the invention there is provided an amplifier for an optical communications network operable to amplify an optical signal modulated with a traffic signal received from an output of a first optical fibre, and to retransmit the amplified signal into a first end of a second optical fibre. The amplifier comprises a modulator operable to further modulate the optical signal with an incoherent optical frequency domain reflectometry, IOFDR, test signal, and a first detector operable to detect scattered radiation received from at least one of the first end of the second optical fibre or the output of the first optical fibre.

According to a third aspect of the invention there is provided a transmitter for an optical communications network. The transmitter comprises an optical source operable to generate an optical signal for transmission into a first end of an optical fibre, a first modulator operable to modulate the optical signal with an incoherent optical frequency domain reflectometry, IOFDR, test signal, a second modulator operable to further modulate the optical signal with a traffic signal, and a detector operable to detect scattered radiation received from the first end of the optical fibre. The optical source may be a laser and/or an amplifier.

Using a device in accordance with either the second or third aspect the IOFDR test signal may be transmitted using the same physical equipment which is used to amplify the traffic signal, in the case of the second aspect, or to produce the optical signal to which the traffic signal will be applied, in the case of the third aspect. This arrangement reduces the complexity, and hence the expense, involved in providing a means for determining the location of a fibre break. The IOFDR signal may be transmitted at the same time as the traffic signal, without disrupting the traffic signal. Preferably the IOFDR signal is transmitted at the same wavelength as the traffic signal (for example, at or near a wavelength of 1550 nm).

The modulator (or the first modulator) may comprise a pump laser of the amplifier, such that the IOFDR signal is applied to the same optical signal as the traffic signal.

The amplifier/transmitter may further comprise a second detector operable to detect a signal to be transmitted by the amplifier/transmitter, which signal is modulated with the IOFDR test signal. The signal may also be modulated with the traffic signal.

An output from the detector or detectors may be provided to an incoherent optical frequency domain reflectometry, IOFDR, analyser which is operable to determine a distance to a break in the optical fibre by analysing the output of the detector(s) using incoherent optical frequency domain reflectometry. The analyser may be operable to combine the output of the first detector with a phase-shifted copy of the second output of the second detector to produce a combined signal, and to filter that combined signal with a low pass filter.

The amplifier/transmitter may further comprise a microprocessor programmed to control the operation of the pump laser. The microprocessor may comprise the analyser referred to above.

In the case of the second aspect of the invention, the amplifier may further comprise a third detector operable to detect scattered radiation received from the output of the first optical fibre. This allows the amplifier to detect a break in the first optical fibre (i.e. the fibre from which it receives a signal to be amplified) as well as (or instead of) allowing the amplifier to detect a break in the second optical fibre (i.e. the fibre onto which it transmits the amplified optical signal).

According to a fifth aspect of the invention there is provided an amplifier for an optical communications network, the amplifier comprising a pump laser operable in use to pump a gain medium of the amplifier, and a microprocessor for controlling the operation of the amplifier, wherein the microprocessor is operable to modulate an output of the pump laser with an incoherent optical frequency domain reflectometry, IOFDR, test signal, and wherein the amplifier further comprises a detector operable to detect scattered radiation received at the amplifier, which radiation has been modulated with the IOFDR test signal.

The amplifier may further comprise an input connector for receiving an optical signal to be amplified, wherein the detector is operable to detect scattered radiation received at the input connector.

According to another aspect of the invention there is provided an optical communications network comprising the amplifier and/or transmitter of any one of the second, third or fourth aspects of the invention.

The optical communications network may comprise a first such amplifier/transmitter located at a first end of an optical fibre, and a second amplifier/transmitter located at a second end of the optical fibre, or of an associated optical fibre (as defined above). The optical communications network may further comprise a network manager operable to receive data from the detectors of the first and second amplifiers/transmitters, and to determine the distance to a break in the optical fibre or fibres by analysing the data provided by the first and second amplifiers/transmitters using incoherent optical frequency domain reflectometry.

DETAILED DESCRIPTION

The present invention uses optical frequency domain reflectometry, and in particular incoherent optical frequency domain reflectometry (IOFDR) to detect the existence of a fibre break, and to locate the break by measuring the distance to the break. The method works for both in-service and out-of-service systems.

In IOFDR as used herein, an IOFDR test signal is transmitted along an optical fibre at a range of frequencies. For each frequency, the launched (i.e. transmitted) optical power of the IOFDR signal is detected (or otherwise determined, for example from the power at which the pump laser is driven, if the laser is a simple laser which does not introduce a phase shift into the output power, like an EDFA), as well as the backscattered optical power (returning from the fibre, after being reflected along the whole residual span of the fibre). The fibre break itself reflects little optical power (thus if there is no break the IOFDR method will detect the length of the entire unbroken span of the fibre). The backscattered optical power is usually in the order of 40-45 dB lower than the incident optical power.

The above measurements are converted into electrical signals and post-processed, as described in detail below. Knowing the attenuation coefficient of the fibre and the effective refractive index of the fibre, information about the distance of the break from the amplifier can be extracted from a measurement of a difference in phase between the power of the launched signal and the power of the backscattered signal.

In the embodiment of the invention discussed below, the IOFDR test signal is a sinusoidal signal with a very small amplitude modulation index (also known as modulation depth). The IOFDR signal is transmitted at the same wavelength as a traffic signal, preferably using the same laser that is used to generate the traffic signal. The test signal is transmitted simultaneously with the traffic signal, in the form of a small modulation of the traffic signal.

The sinusoidal form of the signal ensures that the backscattered signal is also sinusoidal (although phase shifted with respect to the original IOFDR signal). This would not be the case if the IOFDR had a different (non-sinusoidal) form. By 'small' modulation index it is meant 'sufficiently small so as not to disturb the reception of a traffic signal by transponders or receiver optics'. For example, in the case of a typical amplifier having an output of about 10-20 dBm, a suitably small modulation index might be a signal with a variation of 0.5 dB peak-to-peak. It will be appreciated that in embodiments where the method is intended to be used when the span is out-of-service, the above requirement for a 'small' modulation depth need not be complied with.

Figure 1:
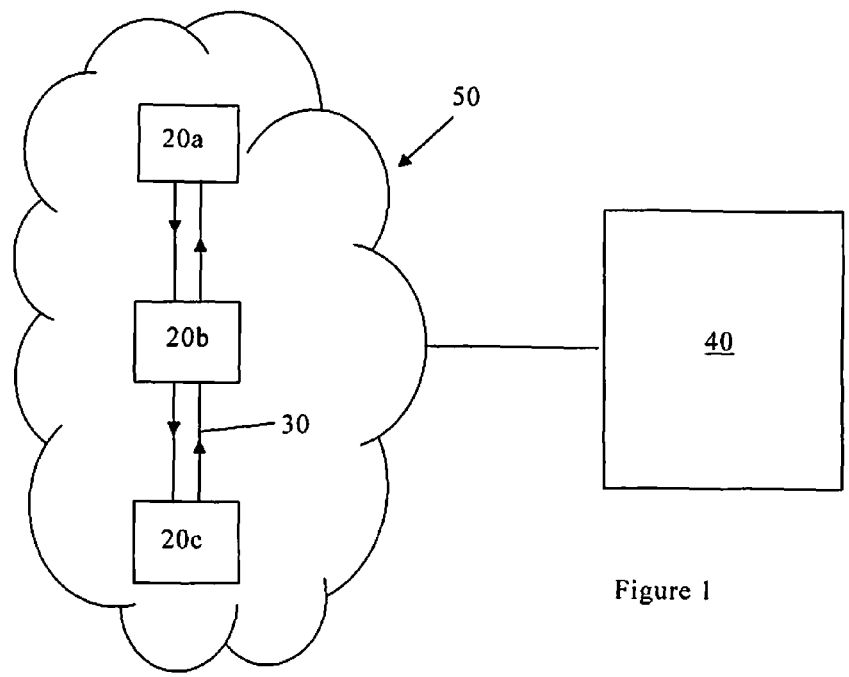
FIG. 1 is a schematic representation of an optical network.
Figure 2:
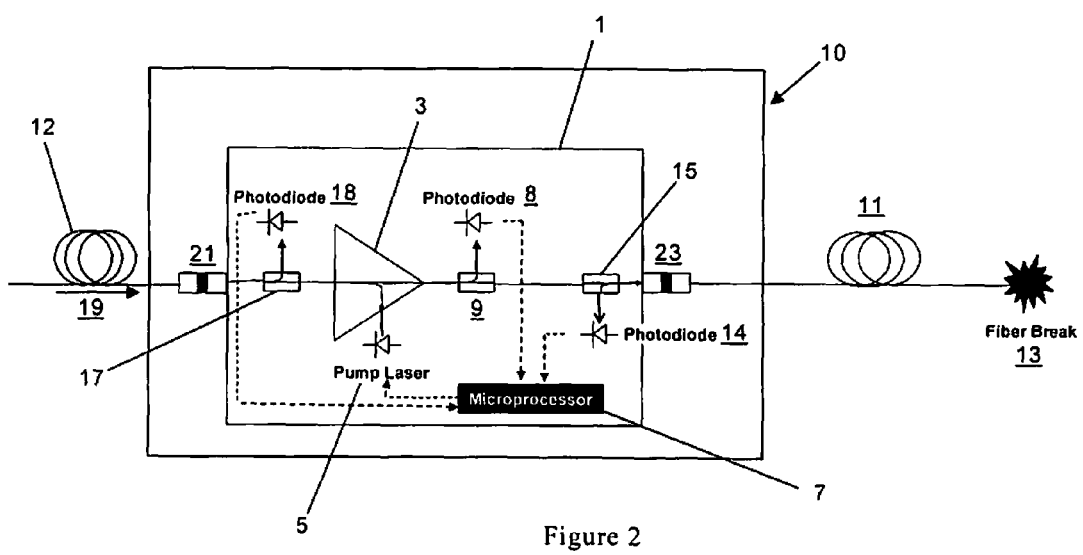
FIG. 2 shows one embodiment of an amplifier in accordance with the invention.

FIG. 2 shows schematically the internal structure of an amplifier 1, which may be located on a card 10 installed in a node within an optical network. In this example, the node is a repeater node of the type shown in FIG. 1 as node 20b. In such a repeater node 20b the amplifier 1 is operable to amplify an optical signal 19 that is received from a first optical fibre 12 at an input connector 21 of the amplifier, before retransmitting that amplified signal onto a second optical fibre 11 via an output connector 23.

The amplifier 1 comprises an active gain medium 3, such as an erbium doped fibre, which is pumped from a pump laser 5 controlled by a microprocessor 7. Any signal 19 received at the input connector 21 is amplified in the gain medium 3 in such a way that any modulation present on the signal (e.g. a traffic signal) is preserved in the output amplified signal.

The amplifier further comprises first, second and third optical splitters respectively numbered 9, 15 and 17 in FIG. 2, and first, second and third photodetectors (e.g. photodiodes) respectively numbered 8, 14 and 18. The third splitter and third photodetector may be as an alternative to, or in addition to, the second splitter and second photodetector.

A small portion (eg between 1 and 10%) of the amplified light output from the active gain medium 3 is directed to the first photodiode 8 by means of the first splitter 9. Thus the first photodiode 8 produces an electrical signal that is proportional to the optical power of the amplified signal that will be output from the amplifier. That electrical signal is fed to the microprocessor 7.

Similarly, substantially all the light backscattered from the fibre 11 is directed to the second photodiode 14 by the second splitter 15, so that the second photodiode produces an electrical signal proportional to the optical power of the backscattered light. The output from that second photodiode 14 is also fed to the microprocessor 7.

When present, the third splitter 17 directs a small portion (e.g. 1%, 5%, 10%) of light incoming to the amplifier to the third photodiode 18, and feeds the output of the third photodiode to the microprocessor 7.

The optical power backscattered from the fibre 11 is mainly due to Rayleigh backscatter. The directivity of the splitter 15 should be chosen depending on the fibre return loss (which is usually specified by the fibre manufacturer). In general, the difference between the directivity of the splitter and the fibre return loss should be at least 10 dB. For example, for a G652 fibre (which is currently commonly used in the field), since the return loss is about 30 dB, a good value for the directivity is at least 40 dB). For the same reason, the method works correctly if the return loss of the break of the fibre is about 40 dB. This is the case of all kind of fibres used in telecommunications (the surface of the break is irregular so having a poor reflecting capability), except the case of a cut made with a very sharp and hard blade used for splicing two fibres: but in that case, often an engineer is already at the fibre break, repairing it, and in that case, there is often no reason to measure the distance to the break.

In use, the pump laser 5 generates a continuous wave (CW) signal to pump the active medium 3. An optical signal 19 received at the amplifier input connector 21 is amplified within the active medium 3 and transmitted onto the fibre 11 through the amplifier output connector 23. As discussed above, when the communications system is transmitting information, the optical signal 19 will comprise traffic in the form of a modulation to that signal. That modulation will be preserved when the signal is amplified, in the same way as in a conventional amplifier.

However, unlike a conventional amplifier, the microprocessor controls the pump laser to introduce a sinusoidal modulation to the CW signal, so that (in the absence of any traffic signal) the amplifier output power measured from the first photodiode 8 will have the normal CW component plus a sinusoidal signal of some tenths of dB. In the event that the signal does comprise traffic, the signal output from the amplifier 1 comprises the amplified traffic signal, and also comprises an additional sinusoidal test signal: the IOFDR test signal.

Figure 2A:
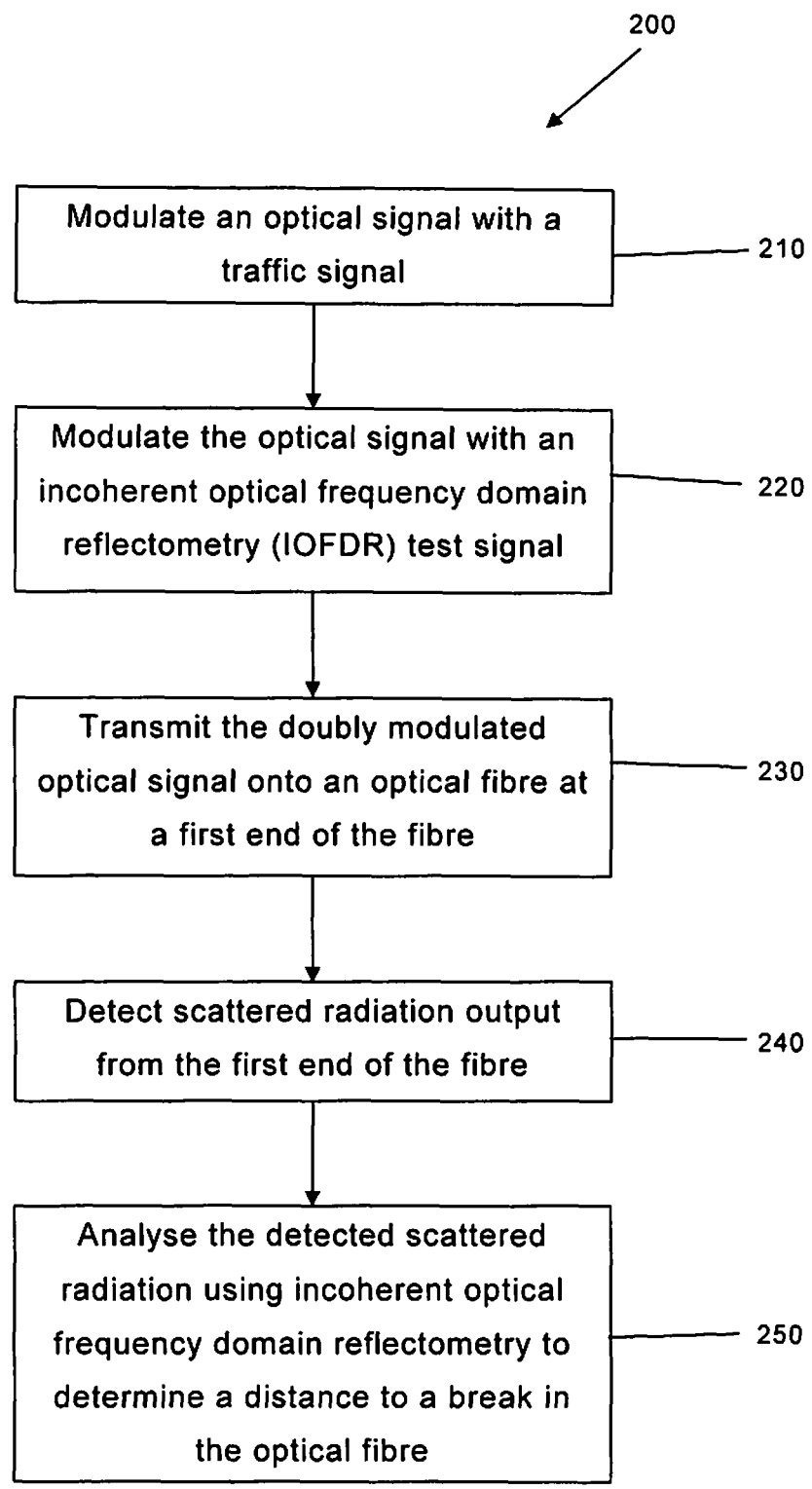
FIG. 2a is a flow chart schematically setting out the steps of a method of determining a location of a break in an optical fibre in one embodiment of the present invention.
Figure 2B:
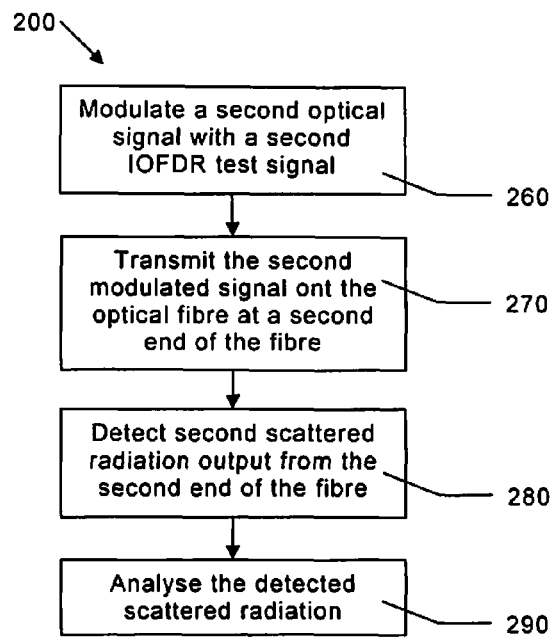
FIG. 2b is a flow chart schematically setting out the steps of a method of determining a location of a break in an optical fibre in an alternative embodiment of the present invention.
Figure 2C:
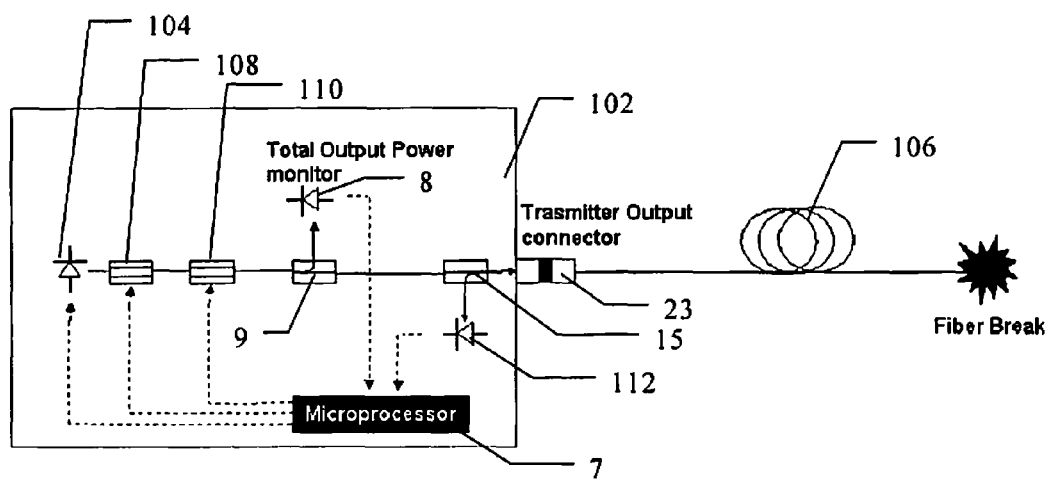
FIG. 2c shows one embodiment of a transmitter in accordance with the invention.

In an alternative embodiment, illustrated in FIG. 2c, the invention is used at a launch transmitter (amplifier), 102, where the IOFDR signal is modulated onto an optical signal before a traffic signal. The transmitter 102 comprises an optical source 104 that generates an optical signal for transmission into a first end of an optical fibre 106 and a first modulator 108 modulating the optical signal with the IOFDR test signal. The transmitter 102 also comprises a second modulator 110 further modulating the optical signal with a traffic signal, and a detector 112 for detecting scattered radiation received from the first end of the optical fibre 106.

An IOFDR method 200 in accordance with the invention is depicted schematically in FIG. 2a. The method includes modulating an optical signal with a traffic signal (step 210) and modulating the optical signal with an incoherent optical frequency domain reflectometry (IOFDR) test signal (step 220). Both the traffic signal and the optical signal are modulated onto the same optical signal, so that both signals are transmitted into the network on the same channel. Steps 210 and 220 could be performed in any order. That is, the IOFDR signal might be modulated onto an optical signal that has already been modulated with a traffic signal (as discussed above) or, alternatively, the IOFDR might be modulated onto a 'blank' optical signal and a traffic signal might be subsequently modulated onto that signal, on top of the IOFDR signal.

The doubly modulated optical signal is then transmitted onto an optical fibre at a first end of the fibre (step 230).

Radiation that is output from the first end of the fibre is detected in step 240. If there is a break in the fibre, the amount of scattered radiation that is received will be indicative of the distance to the break (the residual fibre span length). Finally, in step 250, the detected scattered radiation is analysed using incoherent optical frequency domain reflectometry to determine the distance to the break in the optical fibre.

The method 200, in a preferred embodiment illustrated in FIG. 2b, further comprises modulating 260 a second optical signal with a second IOFDR test signal and transmitting 270 the modulated second optical signal onto the optical fibre, or an associated optical fibre, at a second end of that optical fibre. A second scattered radiation output from the second end of the optical fibre is detected 280 and in the final step this embodiment comprises a step of analysing 290 the second scattered radiation. As a result both the first as well as the second scattered radiation are analysed, using incoherent optical frequency domain reflectometry, to determine the distance to the break in the optical fibre.

The IOFDR method, and how the backscattered signal is processed to determine the location of a fibre break, will now be described in more detail, with reference to the Figures.

To obtain information about the location of a fibre break, the operations that must be done (digitally or by equivalent analogue circuits, either at the amplifier by the microprocessor, or at a remote location such as the central office) are as follows:

1) A 90 degree phase shift is introduced to the outgoing signal (as measured at the first photodiode 8). This is needed to have a clear measurable backscattered maximum power in the frequency range of interest.

2) The phase-shifted signal of point 1) is multiplied with the reading of the second photodiode 14 (representative of the backscattered optical power). The result is filtered with a low pass filter (e.g. 100 Hz wide) to remove any double frequency content coming from multiplication (demodulation).

3) The operations in points 1) and 2) are repeated with a range of different frequencies of the sinusoidal test signal, separated by a suitable frequency step (e.g. 100 Hz) in a suitable range of frequencies (e.g. increasing from 300 to 10000 Hz, or vice versa). The modulation depth and power of the test signal is kept constant for each of the different frequencies.

Figure 3:
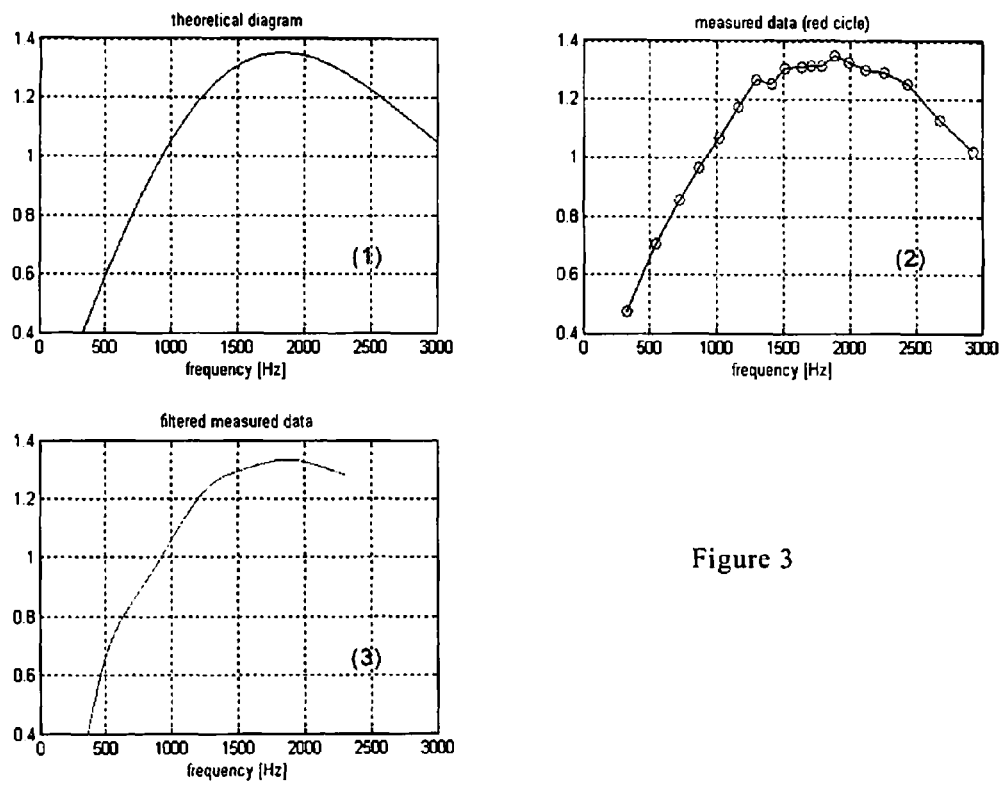
FIG. 3 shows post-processed optical power plotted against frequency for (1) theoretical data, (2) measured data, and (3) filtered measured data.

4) The result of the operation in point 3) is a diagram shown schematically in FIG. 3 (for a span 25 km long). In FIG. 3, the received optical power, after being processed according to step 2, is plotted against transmitted frequency for both theoretical data (plot '1') and measured data (shown in plot '2'). Plot '3' shows the measured data of plot '2' after being filtered with a suitable low pass filter to clean the noise from the measured data to make the maximum clearer.

Whilst, the backscattered power amplitude has some change with the span length, it is very small to be detected. The numerical processing in points 1) and 2) above are made to keep into account also (and especially) the phase change of the backscattered power. Both these changes with the residual span length contribute to create the measurable maximum of FIG. 3.

The frequency (f_max) at which this maximum optical power appears depends on the distance to the break, on the effective refractive index of the fibre and on the attenuation coefficient of the fibre of the residual span. Knowing the attenuation coefficient and the effective refractive index of the fibre (which are usually specified for a given fibre type, or which might be determined experimentally in a conventional way), it is possible to calculate the residual fibre length (i.e. the distance to a break) once the f_max has been determined.

5) To calculate the residual span length we exploit the relation that exists between the frequency of the test signal, the back-scattered optical power and the span length. That relationship is governed by the following equation, which is plotted in 3D in FIG. 4:

$$G(f, L, a) = \frac{\sqrt{(e^{La} \cdot \cos(2kL) - 1)^2 + (e^{2La} \cdot \sin(2kL))^2}}{\sqrt{a^2 + k^2}} * \sin\left(-a\tan\left(\frac{k}{a}\right) + a\tan\left(\frac{e^{2La} \cdot \sin(2kL)}{e^{2La} \cdot \cos(2kL) - 1}\right)\right)$$

Equation 1 where G(f,L,a) is the normalized back-scattered optical power, L is the distance to the fibre break, a is the attenuation coefficient in Nepers/km and k is the wave vector corresponding to the frequency of the sinusoidal IOFDR signal (k is related to the frequency f in a conventional way, using the relation k=2πf/v, where v is the phase velocity of the test signal).

To find the distance to the break, we need to find the distance which corresponds to the maximum frequency, f_max. To do that we find the zero of the following non-linear function:

$$f(L) = e^{-2La} \cdot \sqrt{(2k_{max}L)^2 + (2La + 1)^2} \cdot \sin\left(2k_{max}L + 2 \cdot \arctan\left(\frac{k_{max}}{a}\right) + \arctan\left(\frac{2La + 1}{2k_{max}L}\right)\right) - \cos\left(2 \cdot \arctan\left(\frac{k_{max}}{a}\right)\right)$$

Equation 2 where $k_{max}$ is the wave vector correspondent to the frequency of the maximum of FIG. 3, f_max.

Figure 4:
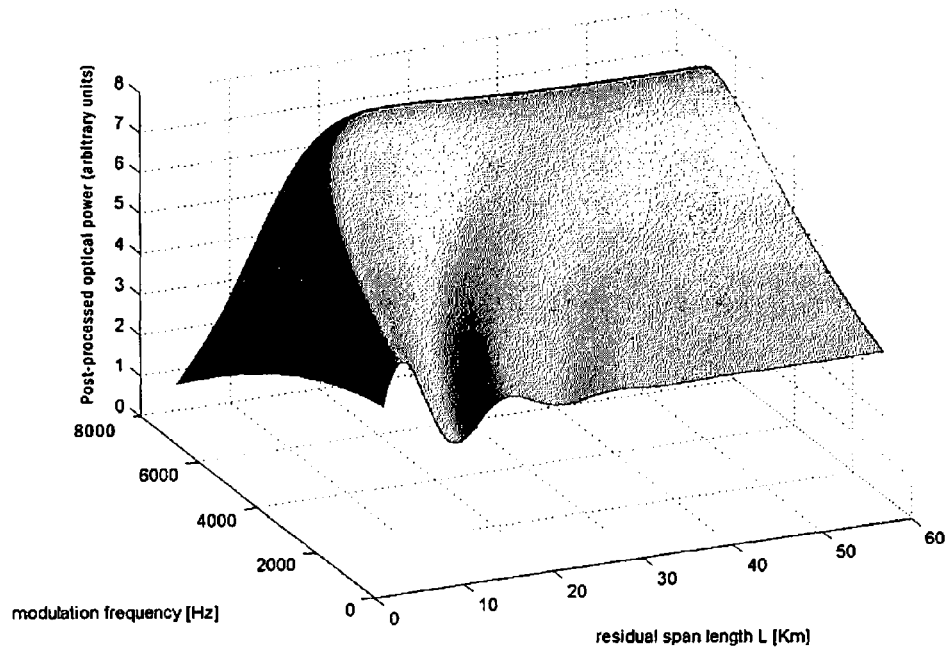
FIG. 4 shows a plot of Equation 1.

This function f(L) is proportional to the first derivative of the 3-D function G(f,L,a) shown in FIG. 4, with respect to the frequency axis, with fixed L and a.

Solving the equation f(L)=0 for L will give the distance to the break (or a set of possible distances, as discussed below).

It should be noted that the zero of the function f(L) (which corresponds to the maximum of the post-processed received optical power shown in FIG. 3) moves towards higher frequencies as the residual span length decreases. This means that there is a minimum residual span length L which can be determined from an amplifier, meaning that there is a 'dead zone' close to the amplifier where breaks cannot be detected from that amplifier. The extent of the dead zone depends on the dynamic range of the amplifier (which is limited, generally, to some tens of KHz) and on the fibre parameters. For example, using a maximum frequency of 10 KHz, the dead zone extends for a couple of Kilometres. In the event that a break occurs within the dead zone, it may be possible to determine the location of that break from another amplifier connected to that span, e.g. from an amplifier at the opposite end of the span.

The precision of the distance measurement is also limited by optical and electrical noise during the measurement. However, the use of the two low pass filters (the one after the multiplier in step 2 and another one that filters the set of the measures shown in FIG. 3) and the use of multiple frequencies allows a reasonably precise measurement of the distance to the fibre break to be obtained.

The measurement is independent of the total output power of the amplifier (so the IOFDR signal can be of lower power than the traffic signal if required) and also from the modulation depth of the sinusoidal signal. If, from one frequency sweep to another (i.e. from one test to another, and not within the same test), the sinusoidal signal or the total optical power change their amplitude, the effect is that the diagram shown in FIG. 3 translates along the ordinate axis, but the form of the diagram remains the same, and the frequency of the maximum, so that it is still possible to determine the location of the break using the above method. However, the modulation depth and power should be kept constant within a frequency sweep (i.e. during the operation of point 3), above), to avoid distorting the appearance of the graph shown in FIG. 3, and in particular, to avoid the possibility that other maxima might appear in that graph, which might confuse the determination of the location of the break.

The method explained above assumes that the function f(L) only has one zero, but in practice that is not always the case. We have determined that for a given fibre there is a threshold distance 'X', which is dependent on the attenuation coefficient of the fibre. Below the threshold X, the function f(L) has only one zero. However, above the threshold X, the function f(L) may have more than one zero. Thus solving f(L)=0 will often give more than one answer, one below X, and one or more above X.

Figure 5:
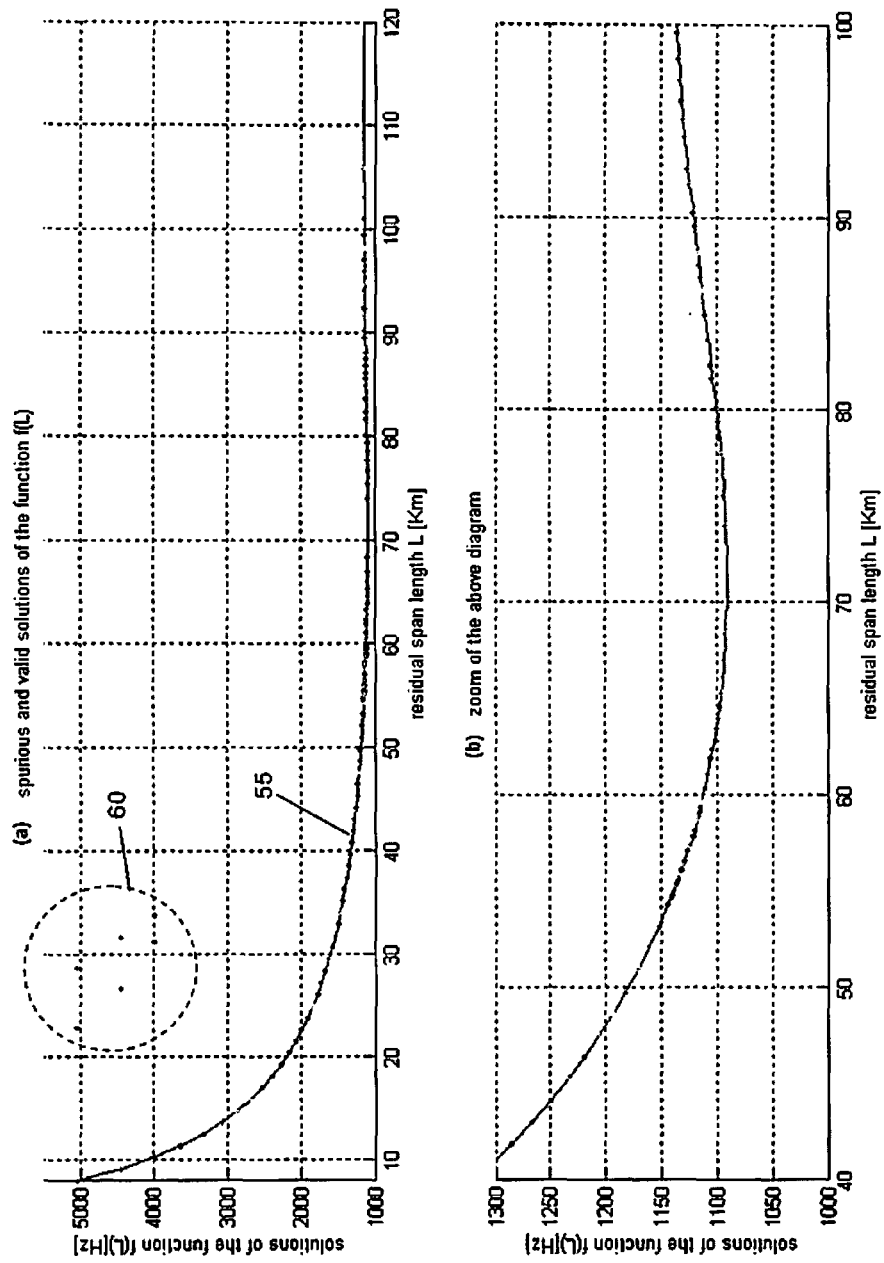
FIG. 5 shows (a) both spurious and valid solutions of the function f(L) (Equation 2) and (b) a close up showing detail of graph (a) between the fibre lengths 40 km and 100 km.

FIG. 5(a) shows all solutions of the equation f(L)=0 for each f_max (in the ordinate axis). These solutions can be divided into two sets: valid solutions (shown by the solid line 55) and not valid solutions (or spurious solutions, the points out of the solid line circled at 60). The spurious solutions must be detected and eliminated because they do not have any physical relevance. In addition, for a given f_max, the set of the valid solutions (that each correspond to a possible real distance to the break) is not always univocal: sometimes it contains more than one solution. This means that, as shown in the lower subplot (b), for some frequencies f_max, there could be more than one possible valid distance to the break.

Figure 6:
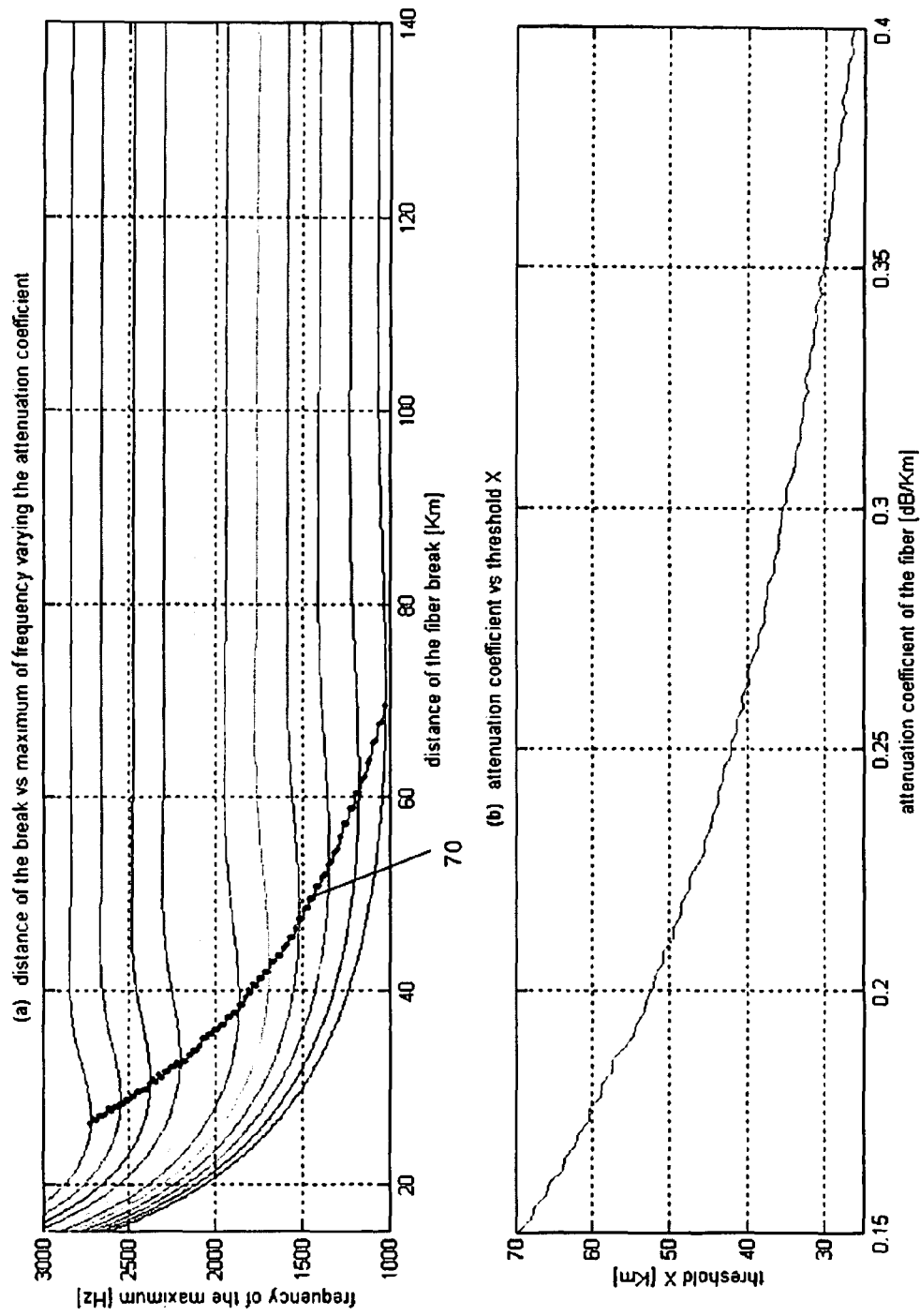
FIG. 6 shows (a) the relationship between the frequency at which maximum backscattered optical power is detected and distance to a fibre break for a variety of fibre attenuation coefficients, and (b) the variation of the distance threshold X with attenuation coefficient.

The threshold X is shown in FIG. 6, and is obtained by taking the points where the diagram of the valid zeros of f(L) has a minimum, marked with a line 70 in FIG. 6(a).

Of course, the distance to the break is unknown, therefore it is only when the total span length is less than X that we can determine for certain the distance to the break using this method. In such a case, where the total span length is lower than the threshold X shown in FIG. 6, it is possible to simply take the minimum solution (L_min), because only that solution will be less than X. That is, only that solution will be physically possible. This automatically eliminates any spurious solutions (because they are at higher length than L_min) and also automatically solves the ambiguity in case of more than one valid solution (in the sense that if the total span length is lower than X, f(L) has just a valid solution, as shown in FIG. 6).

Where the total length of the span is greater than the threshold X, it must be assumed that the function f(L)=0 might have more than one valid solution. In that case, it is necessary to apply a modified method to determine univocally the correct residual span length, by deciding between two potentially valid solutions and/or rejecting spurious solutions of the equation f(L)=0, as described in the following paragraphs.

Where the total span length is greater than the threshold X, the criterion of the minimum length is not enough to provide reliable solutions and we need some other criterion to detect the spurious solutions and to distinguish among the valid solutions, as shown in the following subsections. For example, this limitation means that, looking at FIG. 6, for a fibre with an attenuation coefficient of a=0.2 dB/km, the threshold X is about 50 km, which means that the maximum total span should be lower than about 50 km in order to safely calculate the only solution.

To overcome this limitation, a modified method can be implemented in one or more of at least three ways:

a) Generally, an optical link is bi-directional, that is, is made by two associated fibres (each one for just one direction) put in a unique cable. So, if a fibre break occurs on one such fibre is highly probable that the whole cable has been broken, and then both fibres have been broken, as shown in FIG. 7.

Figure 7:
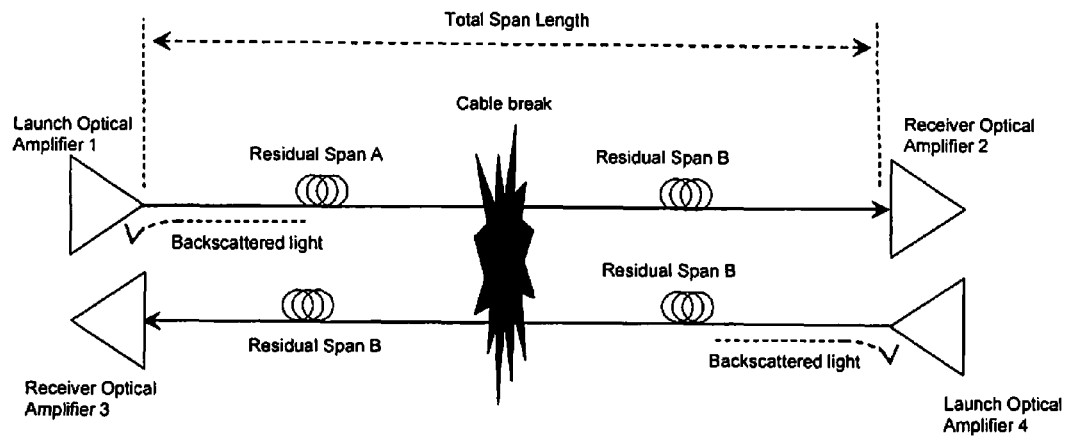
FIG. 7 is a schematic representation of part of an optical communications network.

The improved method comprising calculating the possible distances to the break on both sides of the span (that is, the distance(s) as measured by launch amplifiers 1 and 4, as shown in FIG. 7), and then comparing those two sets of measured distances to determine the actual location of the break. In this way, it is possible to cover more than 100 km of the total span for a fibre with an attenuation coefficient of 0.2 dB/km (and up to 140-150 km for fibres with a lower attenuation coefficient) whilst only generating one solution.

To implement the method at total span lengths higher than the threshold X, we firstly need to detect the spurious solutions and secondly to distinguish among the valid solutions of the equation f(L)=0. In the next two steps, we will do this.

Figure 8:
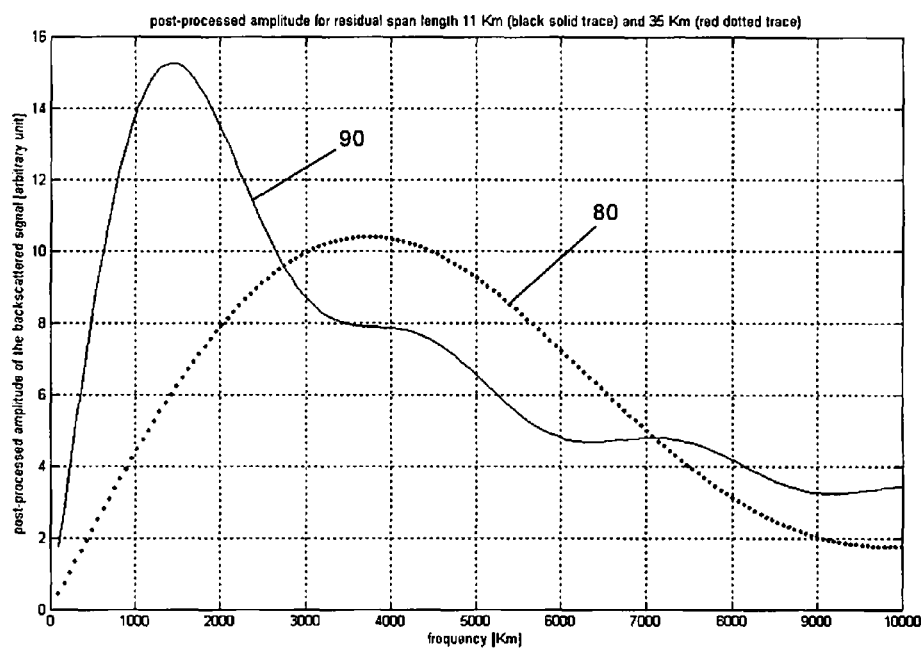
FIG. 8 shows the relationship between the amplitude of a scattered signal (after being processed in accordance with the steps of FIG. 2a) and frequency for two selected distances.
Figure 9:
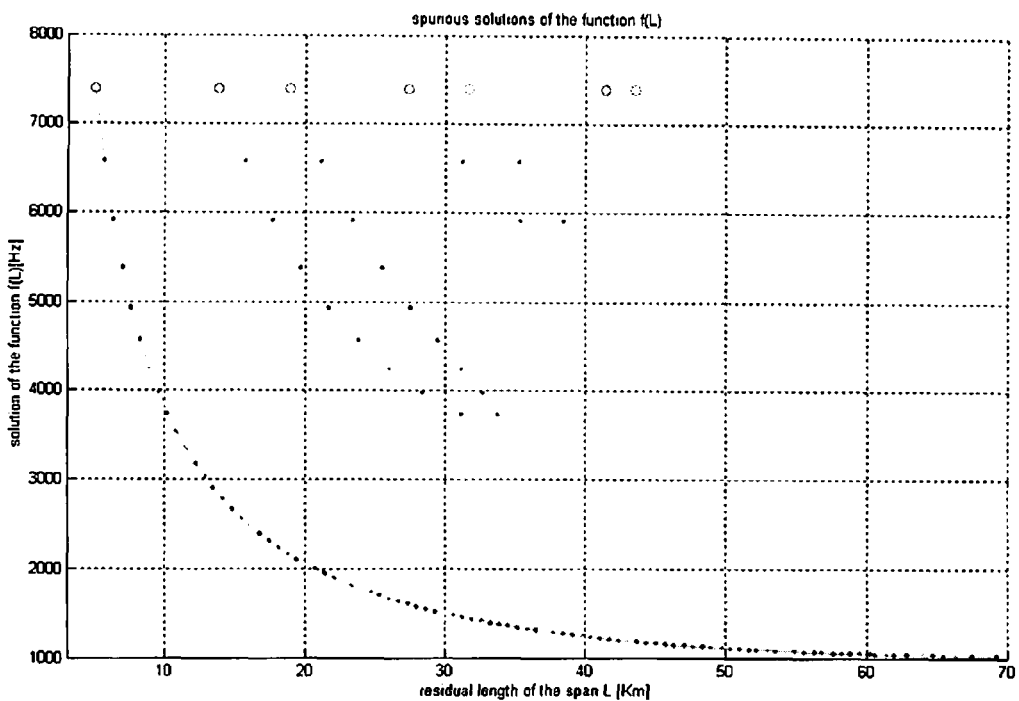
FIG. 9 is a graph similar to FIG. 5 showing spurious and valid solutions of the function f(L)

To detect the spurious solutions, we need to understand the cause of their origin. As said, solving the equation f(L)=0 gives as result all the points where the first derivative of the slice f=constant=f_max of the function G(f,L,a) (showed in FIG. 4) is zero, including all maxima and minima, local and absolute. An example of the origin of a spurious solution is given in FIG. 8 in which are shown two theoretical diagrams obtained following the procedure described in the five-step method given above, for two distances to a the break, 11 km and 35 km. In the case of the dotted trace (35 km) marked 80, the frequency of the maximum f_max is 3700 Hz. The solution of the equation f(L,f_max,a)=0 will give as result L=35 km but also L=11 km, because the diagram of 11 km (shown with a solid line marked 90) has a local maximum at the frequency 3700 Hz. So, we can detect and eliminate this spurious solution noticing that the maximum that we are looking for is the absolute one of each f(L)=constant slice of the function G(f,L,a). Further, this absolute maximum has also the property of being at the minimum frequency, as shown in both FIG. 8 and FIG. 9.

Figure 10:
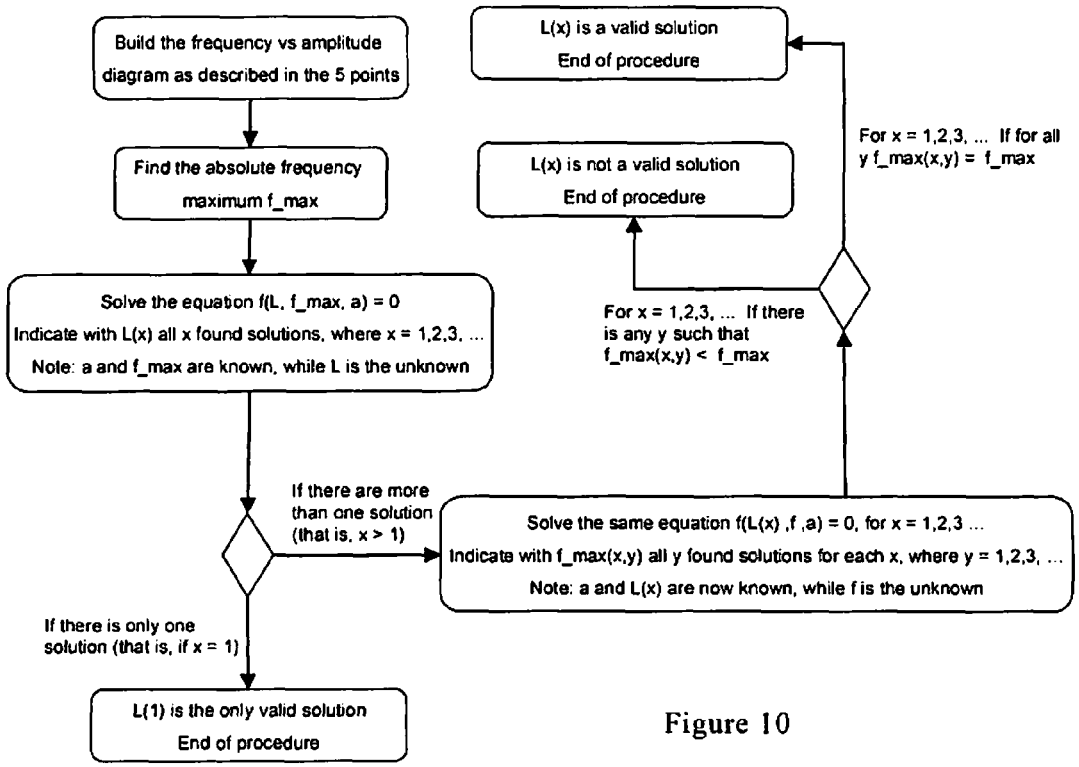
FIG. 10 is a flow chart illustrating one way to distinguish a real solution from spurious and/or multiple valid solutions.

Practically, referring to the flow-chart in FIG. 10, if L=L(x) (with x=1, 2, 3, . . . ) denotes the set of all solutions, the spurious solutions are easily found solving the same equation f(L,f_max,a)=0, where, now, L is fixed (together with a) and the frequency f is the unknown. The solution for each L(x) could be one or more than one frequency denoted with f_max (x,y), where y=1, 2, 3, . . . . If y=1, and the frequency f_max (x,1) is not equal to the real, measured, f_max, the solution L(x) is discarded. If y>1, L(x) is discarded if among the set f_max(x,y) there is a frequency lower than f_max (because this means that f_max is a local minimum or maximum for the slice L(x)=constant of the function G(f,L,a)). In this way, spurious solutions can be located and discarded.

For example, where the residual span is really 35 km, by performing the IOFDR method discussed above, we will determine that the maximum post-processed optical power received corresponds to the transmitted frequency f=f_max=3700 Hz. However, when we solve the equation f(L,f_max,a)=0 we find as solutions 35 km and also 11 km. So, the set of possible solutions are 35 and 11 km. To determine which of those solutions is the correct one, we solve the equations f(35 km, f, a)=0, f(11 km, f, a)=0, where the unknown is now the frequency f. For the first equation we find as solutions f=f_max=3700 Hz and f=10 kHz, while for the second equation we find three solutions, f=1400 Hz, f=f_max=3700 Hz, and f=7100 Hz. Since for the first equation (f(35 km, f, a)=0), f=f_max is the solution at the minimum frequency, we know that 11 km must be a spurious solution and can be discarded.

The second problem is to distinguish the true solution in the case that f(L)=0 has more than one valid solution. However, before doing this, the range in which the method can be applied is discussed.

Figure 11:
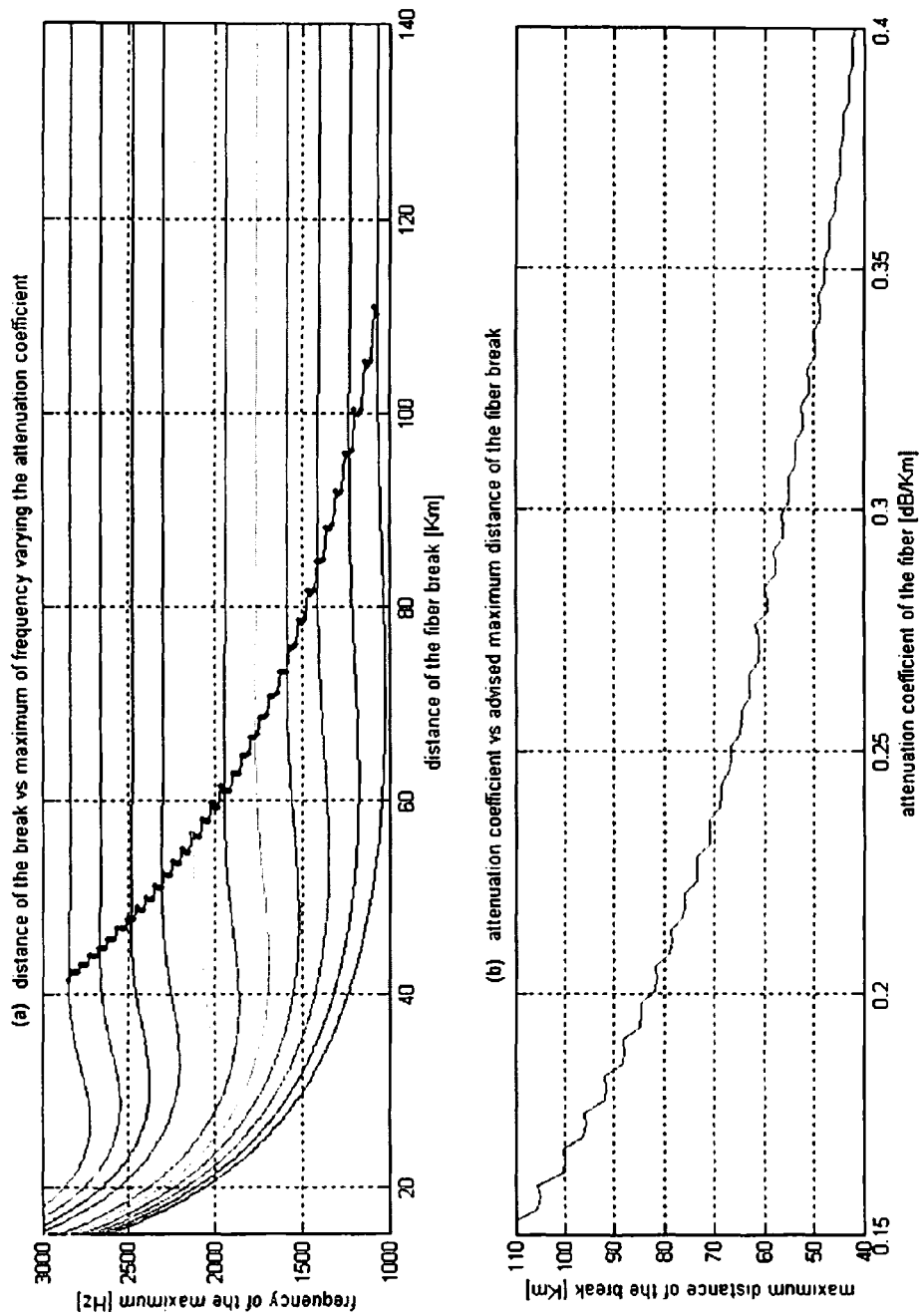
FIG. 11 is a graph similar to FIG. 6, and depicts a maximum fibre span on which the invention can be performed according to one embodiment for a variety of different optical fibre attenuation coefficients.

It can be noticed (in, e.g. FIG. 6) that the function f(L) does not change anymore beyond a certain length L, that is, no more information about the span status can be obtained beyond this distance. For example, for a fibre with a=0.2 dB/km, f(L) does not change if L is higher than about 70-80 km. Furthermore, looking at FIG. 6, it is possible to find a suitable range for L and f_max, where the function f(L) has one or no more than two valid solutions. This range is shown in FIG. 11, and since it is just a little bit lower than the range where no more information comes back from the fibre, it is convenient to establish as the valid application range for each measure that threshold shown in FIG. 11. So, the total length of the span with which the method can be employed to obtain one solution, can be obtained just doubling the maximum distance of the fibre break shown in FIG. 6, while the maximum distance to a break measurable from an amplifier is shown in FIG. 11. Note: this choice guarantees an overlapping zone that allows identifying the real solution in case of more than a valid solution (as described below).

Notice that, inside these ranges, there can be no more than two valid solutions (the spurious having been detected and eliminated following the steps shown in FIG. 10). There are three possible cases 3 cases:

1) Inside the application ranges, there is only one valid solution.
2) Inside the application ranges, there are two valid solutions.
3) The valid solution/solutions is/are beyond the application ranges.

Obviously, if the break distance is out of the valid ranges, the IOFDR measurement will be also out of the ranges, and so option 3) can be rejected immediately. In this way, there could be one or no more than two valid solutions. So, to distinguish between the possible two solutions, we take as the true measurement the measurements from two opposing amplifiers which complement each other, with respect of the total length of the span. In this way, the procedure provides a value of the break distance (from either amplifier).

For example, looking at FIG. 7, if a=0.2 dB/km and the total length of the span is 100 Km, and the fibre break occurs 70 km from the amplifier 1, the amplifier 1 will measure 50 km and 70 km as two possible valid distances to the break. An amplifier at the other end of the cable, for example amplifier 4, will measure 30 km and 90 km as valid distances to the break. Comparing the measurements made by both amplifiers, the distances 50 km and 90 km can easily be rejected because they are not a complement of total span length of 100 km.

This improved procedure allows the real span length to be determined. However, it does require some communication between the two amplifiers and a remote entity, for example with each other so that the measurements can be combined by at least one of the amplifiers' microprocessors. Alternatively, or additionally, each amplifier might provide its measurements (or even only its sensor readings) to a central office, which determines the location of the break.

There is one situation where the above procedure does not, by itself provide enough information to determine the location of the break. That is when the sum of the two solutions determined by one amplifier is equal to the span length (as the other amplifier will determine the same two solutions, so that it is not possible to distinguish between them). That is, for a span of total length equal to Z=(A+B), if the break occurs exactly at one of the two points A or B, the two solutions determined by both of the amplifiers will be exactly the same (A and B). So, in this case, the previous improved method fails. Obviously, this total span length Z is higher than the already mentioned threshold X showed in FIG. 6 (otherwise, f(L) would have only one valid solution that is physically possible).

Figure 12:
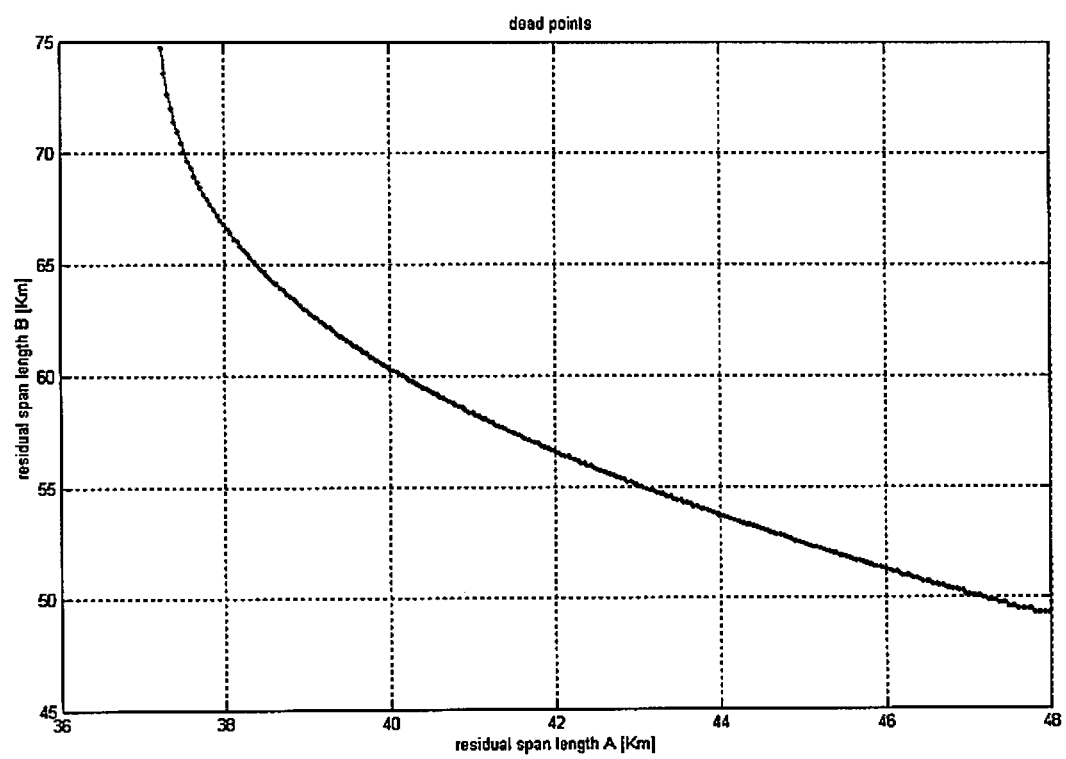
FIG. 12 illustrates 'dead points' at which is it not possible to be certain of the distance to the fibre break without further analysis of the scattered optical signal.

For example, looking at FIGS. 12 and 7, 60 km and 40 km are indistinguishable points for a 100 km long span. If a fibre break occurs 40 km from the amplifier 1 and the total span length is 100 km, the amplifier 1 will measure as valid solutions of the equation f(L)=0 40 km and 60 Km, and the amplifier 4 will also measure the same two solutions (since the break is 60 km from the amplifier 4).

The probability that the break will occur exactly on one of these indistinguishable points is very small. However, if required, it is possible to overcome also this limitation to find the right distance of the break by analyzing the amplitude of the backscattered signal: if the amplifiers 1 and 4 of FIG. 7 launch exactly the same optical power and the Rayleigh backscatter coefficient is the same for the two residual spans A and B, then, the backscattered optical power of the maximum of FIG. 3 is higher for the lower residual span. This allows the system to determine which amplifier is closer to the break (as that one receives more scattered power), and hence to distinguish between the two solutions. However, this modification does result in a more complicated measurement system, with associated higher costs.

b) An alternative way to distinguish between two valid solutions can be achieved by taking measurements on a single optical fibre (e.g. the fibre between amplifiers 1 and 2 in FIG. 7). Thus this method can be implemented even in a unidirectional fibre.

Most amplifiers will output some optical power from the input connector (numbered 21 in FIG. 2) in the form of amplified spontaneous emission (ASE). A proportion of that optical power will be backscattered from any break preceding the amplifier, and can be detected at the amplifier using the third photodiode 18 (see FIG. 2). It is possible to exploit that residual power that comes out from the input connector of the amplifier by noting that the ASE will also include the IOFDR test signal as a slight modulation, because the ASE is produced within the amplifier, which is pumped by a laser modulated with the IOFDR test signal.

So, exactly the same procedure as discussed above can be applied to determine the location of the break, but taking measurements using the third photodiode 18 of amplifier 2, rather than using the second photodiode 14 of amplifier 4. No further changes are needed to the procedure shown above.

The measurements are made simultaneously from the two ends of the span in failure, from the output connector of the launch amplifier 1 and from the input connector of the receiver amplifier 2. In this case, no assumption is made about the break of the fibre, in the sense that, in this case, the method is valid in the case of a break in only one of the fibres of in a cable, rather than requiring both fibres to be broken, as in the method discussed under point (a).

It will be noted that the distance to a fibre break could be determined by exploiting ASE emitted from the input connector, as discussed above, in cases when the span is less than the threshold X, so that the distance to the fibre break could be determined by the amplifier's microprocessor itself, within the amplifier, with no need for the amplifier to communication with another entity in the communications system, such as the central office. An amplifier might be provided with both second and third photodiodes, to enable the amplifier to detect fibre breaks both upstream and downstream of itself, or with only one of the second or third photodiodes.

c) Another variant of the method could be to modify the structure of the amplifier so that some dedicated optical output power (as opposed to ASE) is emitted from the input connector. Again, all considerations made for the point a) above are valid also for this point, replacing the launch amplifier 4 with the receiver amplifier 2 (referring to FIG. 7). Like the case in point (b), no assumption is made about the break of the fibre, in the sense that, in this case, the method is valid in the case of a break of only one of the fibres of the cable.

The above described methods provide a cost-effective and very low impact solution for the detection and measurement of a fibre break in optical networks. The method can be used for both in-service and out-of-service systems. In the case of the basic implementation (where the span in question is less than the threshold X), a single amplifier is able to give the distance to a fibre break. In a case where the span is longer than the threshold X, as discussed in the variants a), b) and c), measurements from two amplifiers at opposing ends of the span in questions are required.

It will be appreciated that in any of the methods described above the distance to a fibre break need not be determined at a network node itself, but may be determined by another system entity such as a central office or network manager.

As described above, the invention requires transmitting an IOFDR test signal (that is a sinusoidal amplitude modulation) along a fibre on a channel (i.e. a wavelength or set of wavelengths) that is also modulated with a traffic signal, for example a WDM or TDM traffic signal. However the skilled man will appreciate that there need not be a traffic signal for the invention to work: the IOFDR signal might be modulated onto a carrier signal, for example, or a 'holding' signal which conveys no information, other than to confirm that the amplifier launching that signal is working. In some cases, an IOFDR signal could be transmitted along a fibre in addition to a traffic signal on a different wavelength to the traffic signal. However, this is disadvantageous as, like the prior art discussed above, it requires the use of a dedicated channel to carry the test signal, increasing the expense of the detection system.

As discussed above, the IOFDR test signal might be modulated onto the output of the pump laser of an amplifier which receives no signal at all—in that case the IOFDR test signal will be present as a modulation of the amplifier's ASE (amplified spontaneous emission), which is produced within most amplifiers even when no signal is being amplified, as long as the amplifier is being pumped. It will be appreciated that ASE will be emitted from the amplifier output connector (as well as the input connector, as discussed in case (b) above). Therefore such modulated ASE could be used to determine the distance to a break downstream of the amplifier, by using the backscattered optical power recorded at the second photodiode 14 in the same way as discussed initially, even when there is no traffic signal. This could be useful in the event of multiple fibre breaks on different spans, where no traffic can be transmitted to an amplifier.

It will be appreciated that the amplifier 1 might be included in a transmitter node, such as an add/drop node 20a, 20c rather than a repeater node. In that case the amplifier may take the form of an optical source of radiation of a known wavelength, such as a laser, onto which a traffic signal may be modulated. As before, the pump laser of such an optical source can be modulated with a small sinusoidal test signal to produce an output signal that is essentially a continuous wave having a slight amplitude modulation. A traffic signal can then be modulated onto that output signal by a modulator (not shown) in a conventional way. Alternatively, the pump laser might be modulated directly with both the traffic signal and the test signal. In either case, the signal output from the node will comprise a carrier wave modulated with both a traffic signal and a sinusoidal IOFDR test signal.

While the invention has been described mainly in relation to a WDM network (or other optical network that generally employs EDFAs (erbium doped fibre amplifiers) as repeater amplifiers, it will be appreciated that the invention could also be used in other types of optical network. For example, the invention might be used in a passive optical network (PON) or in a metro optical network, using another type of amplifier, such as a semiconductor amplifier. In fact, it is contemplated that the invention might be employed in any optical network which uses lasers to transmit traffic-carrying optical signals.

The invention claimed is:

1. A method of monitoring an optical fibre comprising:
doubly modulating an optical signal with a traffic signal and with an incoherent optical frequency domain reflectometry, IOFDR, test signal;
transmitting the doubly modulated optical signal onto an optical fibre at a first end of the fibre;
detecting scattered radiation output from the first end of the fibre; and
analysing the detected scattered radiation using incoherent optical frequency domain reflectometry to determine a distance to a break in the optical fibre,
wherein the IOFDR signal is modulated onto the optical signal at an amplifier by modulating an output of a laser used to pump a gain medium of the amplifier.

2. A method as claimed in claim 1, wherein the traffic signal is modulated onto the optical signal before the IOFDR test signal.

3. A method as claimed in claim 1, wherein the output of the laser is modulated with a sinusoidal signal having a known frequency and amplitude.

4. A method as claimed in claim 3, wherein the steps of doubly modulating the laser output, transmitting the doubly modulated optical signal, and detecting scattered radiation are repeated a plurality of times, the frequency of the IOFDR test signal being altered at at least one of those times.

5. A method as claimed in claim 4, wherein the frequency of the IOFDR test signal is altered at each of the plurality of times, the frequency increasing in steps from a first time to a last time.

6. A method as claimed in claim 1, wherein the step of analysing the detected scattered radiation comprises comparing the detected scattered radiation with the doubly modulated optical signal.

7. A method as claimed in claim 6, wherein the comparison includes combining the detected scattered signal with a phase-shifted copy of the doubly modulated optical signal to produce a combined signal, and filtering that combined signal with a low pass filter.

8. A method as claimed in claim 7, wherein the analysing further comprises determining a transmitted frequency which corresponds to a maximum of the combined signal.

9. A method as claimed in claim 8, wherein the step of analysing further includes determining a fibre length, or a set of fibre lengths, associated with the frequency.

10. A method as claimed in claim 9, wherein the fibre length or set of fibre lengths are determined by solving the equation $$f(L) = e^{-2La} \cdot \sqrt{(2k_{max}L)^2 + (2La+1)^2} \cdot \sin\left(2k_{max}L + 2\cdot\arctan\left(\frac{k_{max}}{a}\right) + \arctan\left(\frac{2La+1}{2k_{max}L}\right)\right) - \cos\left(2\cdot\arctan\left(\frac{k_{max}}{a}\right)\right) = 0.$$

11. A method as claimed in claim 10, wherein solutions to the equation f(L) that do not relate to an absolute maximum of the equation $$G(f, L, a) = \frac{\sqrt{(e^{2La}\cdot\cos(2kL) - 1)^2 + (e^{2La}\cdot\sin(2kL))^2}}{\sqrt{a^2 + k^2}} * \sin\left(-a\tan\left(\frac{k}{a}\right) + a\tan\left(\frac{e^{2La}\cdot\sin(2kL)}{e^{2La}\cdot\cos(2kL) - 1}\right)\right)$$

are discarded.

12. A method as claimed in claim 1, further comprising
modulating a second optical signal with a second incoherent optical frequency domain reflectometry, IOFDR, test signal;
transmitting the modulated second optical signal onto the optical fibre, or an associated optical fibre, at a second end of that optical fibre;
detecting second scattered radiation output from the second end of the optical fibre; and
analysing the second scattered radiation, as well as the first scattered radiation, using incoherent optical frequency domain reflectometry, to determine the distance to the break in the optical fibre.

13. A transmitter for an optical communications network comprising:
an optical source configured to generate an optical signal for transmission into a first end of an optical fibre,
a first modulator configured to modulate the optical signal with an incoherent optical frequency domain reflectometry, IOFDR, test signal,
a second modulator configured to further modulate the optical signal with a traffic signal, and a detector operable to detect scattered radiation received from the first end of the optical fibre,
wherein the IOFDR signal is modulated onto the optical signal at an amplifier by modulating an output of a laser used to pump a gain medium of the amplifier.

* * * * *